United States Patent
Simmons et al.

(10) Patent No.: US 10,635,494 B2
(45) Date of Patent: Apr. 28, 2020

(54) MEMORY POOL ALLOCATION FOR A MULTI-CORE SYSTEM

(71) Applicant: Microchip Technology Incorporated, Chandler, AZ (US)

(72) Inventors: Michael Simmons, Chandler, AZ (US); Anjana Priya Sistla, Bangalore (IN); Priyank Gupta, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 100 days.

(21) Appl. No.: 15/974,480

(22) Filed: May 8, 2018

(65) Prior Publication Data

US 2019/0347133 A1 Nov. 14, 2019

(51) Int. Cl.
G06F 12/00 (2006.01)
G06F 9/50 (2006.01)
G06F 8/41 (2018.01)
G06F 9/54 (2006.01)
G06F 12/02 (2006.01)
G06F 13/00 (2006.01)
G06F 13/28 (2006.01)

(52) U.S. Cl.
CPC ............ G06F 9/5016 (2013.01); G06F 8/441 (2013.01); G06F 9/544 (2013.01); G06F 12/023 (2013.01); G06F 2209/5011 (2013.01)

(58) Field of Classification Search
CPC ........ G06F 9/5016; G06F 9/544; G06F 8/441; G06F 12/023; G06F 2209/5011
See application file for complete search history.

(56) References Cited

U.S. PATENT DOCUMENTS

| | | | | |
|---|---|---|---|---|
| 6,058,460 | A | 5/2000 | Nakhimovsky | 711/153 |
| 6,226,720 | B1* | 5/2001 | Henderson | G06F 12/0607 711/157 |
| 6,480,941 | B1* | 11/2002 | Franke | G06F 12/0284 710/317 |
| 6,954,821 | B2* | 10/2005 | Fitzsimmons | G06F 13/4022 710/317 |
| 2003/0093628 | A1* | 5/2003 | Matter | G06F 9/5016 711/153 |

(Continued)

FOREIGN PATENT DOCUMENTS

WO 2017/011223 A1 1/2017 ............... G06F 9/50

OTHER PUBLICATIONS

International Search Report and Written Opinion, Application No. PCT/US2019/030111, 11 pages, dated Aug. 9, 2019.

*Primary Examiner* — Mark A Giardino, Jr.
(74) *Attorney, Agent, or Firm* — Slayden Grubert Beard PLLC

(57) ABSTRACT

An apparatus includes processing cores, memory blocks, a connection between each of processing core and memory block, chip selection circuit, and chip selection circuit busses between the chip selection circuit and each of the memory blocks. Each memory block includes a data port and a memory check port. The chip selection circuit is configured to enable writing data from a highest priority core through respective data ports of the memory blocks. The chip selection circuit is further configured to enable writing data from other cores through respective memory check ports of the memory blocks.

14 Claims, 6 Drawing Sheets

(56) References Cited

U.S. PATENT DOCUMENTS

| | | | | |
|---|---|---|---|---|
| 2005/0108495 A1* | 5/2005 | McKenney | ......... | G06F 17/5045 |
| | | | | 711/170 |
| 2007/0070795 A1* | 3/2007 | Do | ....................... | G11C 7/1006 |
| | | | | 365/189.14 |
| 2009/0059711 A1* | 3/2009 | Oh | ....................... | G11C 7/1075 |
| | | | | 365/230.05 |
| 2012/0266183 A1 | 10/2012 | Sandstrom et al. | .......... | 719/312 |
| 2012/0290755 A1* | 11/2012 | Chachad | ............ | H03K 19/0016 |
| | | | | 710/244 |

* cited by examiner

RAMALLOCXX: [ODD, EVEN]:
11 = RAM PANEL IS ALLOCATED TO THE DSP
10 = RAM PANEL IS ALLOCATED TO THE APP CPU
01 = RAM PANEL IS ALLOCATED TO THE BT CPU
00 = RAM PANEL IS UNALLOCATED/OFF

| RAMALLOC16 | | RAMALLOC15 | | RAMALLOC14 | | RAMALLOC13 | |
|---|---|---|---|---|---|---|---|
| 31 | 30 | 29 | 28 | 27 | 26 | 25 | 24 |

| RAMALLOC12 | | RAMALLOC11 | | RAMALLOC10 | | RAMALLOC9 | |
|---|---|---|---|---|---|---|---|
| 23 | 22 | 21 | 20 | 19 | 18 | 17 | 16 |

| RAMALLOC8 | | RAMALLOC7 | | RAMALLOC6 | | RAMALLOC5 | |
|---|---|---|---|---|---|---|---|
| 15 | 14 | 13 | 12 | 11 | 10 | 9 | 8 |

| RAMALLOC4 | | RAMALLOC3 | | RAMALLOC2 | | RAMALLOC1 | |
|---|---|---|---|---|---|---|---|
| 7 | 6 | 5 | 4 | 3 | 2 | 1 | 0 |

FIG. 6

MEMORY POOL ALLOCATION FOR A MULTI-CORE SYSTEM

FIELD OF THE INVENTION

The present disclosure relates to memory management in electronic devices and, more particularly, to memory pool allocation for a multi-core system.

BACKGROUND

An electronic device may include multiple processors or processors with multiple execution cores. Read-only memory (ROM) and random access memory (RAM) are physically implemented in electronic devices and communicatively coupled to electronic devices.

Applications and processes running on an electronic device may share access to the same physical memory. Shared memory may refer to a block of RAM that can be accessed by several different central processing units (CPUs) or cores in a multiprocessor computer system. The applications may be running on these multiple cores. To implement shared memory, the system may use uniform memory access. In such a case, all the cores share the physical memory uniformly. The system may instead use non-uniform memory access. In such a case, memory access time depends on the memory location relative to a processor. In still other cases, a system may use a cache memory architecture. This may be the most common implementation, wherein local memories or caches for each core may be used and, when needed, additional contents fetched from main memory. A shared memory system may be relatively easy to program since all processors share a single view of data.

SUMMARY

Embodiments of the present disclosure may include an apparatus. The apparatus may include processing cores including a first core and a second core and a pool of memory including memory blocks. Each memory block may include a data port and a memory check port, first connections between the first core and each of the plurality of memory blocks, second connections between the second core and each of the plurality of memory blocks, and a chip selection circuit configure to share access between the first core and the second core to the pool of memory. In combination with any of the above embodiments, the chip selection circuit may share access to the pool of memory by enabling access of data from the first core to the memory blocks through respective data ports of the memory blocks, and enabling access of data from the second core to the memory blocks through respective memory check ports of the memory blocks. In combination with any of the above embodiments, the chip selection circuit may be further configured to share access to the pool of memory between the first core, the second core, and a third core of the plurality of processing cores by enabling access of data from the third core to the memory blocks through the respective memory check ports of the memory blocks. In combination with any of the above embodiments, the chip selection circuit may be further configured to enable access signals from memory test circuits to the memory blocks through the respective memory check ports of the memory blocks. In combination with any of the above embodiments, the chip selection circuit may be further configured to enable access of data from the first core through respective data ports and enable access of data from the second core through respective memory check ports based on a determination that the first core is a higher priority core than the second core. In combination with any of the above embodiments, the chip selection circuit may be further configured to simultaneously enable access of data from the first core to a given memory block through a respective data port of the given memory, enable access of data from the second core to the given memory block through a respective memory check port of the given memory. In combination with any of the above embodiments, the memory blocks are of different sizes. In combination with any of the above embodiments, an assignment of memory blocks to respective cores may be determined during compilation of software to be executed by the first core and the second core. In combination with any of the above embodiments, the chip selection circuit may be further configured to determine from a compilation process an assignment of memory blocks to cores, and, based on a determination that a given memory block is not assigned to a core, turn off the given memory block.

Embodiments of the present disclosure may include a microprocessor, microcontroller, system, or electronic device including an apparatus of the above embodiments.

Embodiments of the present disclosure may include a non-transitory machine-readable medium including instructions. The instructions, when loaded and executed by a processor, may configure the processor to compile source instructions into object code to be executed by a first core and a second core to operate on a target machine, identify program memory requirements of the first core and the second core, identify a size and quantity of each of a plurality of memory blocks available on the target machine, and assign individual ones of the memory blocks to the first core or the second core based upon the program memory requirements and the size and quantity of the memory blocks. The instructions may form an application to be executed by the apparatuses of the embodiments described above.

Embodiments of the present disclosure may include methods performed by any of the apparatuses, microprocessors, microcontrollers, systems, or electronic devices of the above embodiments.

Embodiments of the present disclosure may include methods performed by the instructions of the above embodiments when executed on a processor.

BRIEF DESCRIPTION OF THE DRAWINGS

FIG. 6 illustrates an example allocation designation mechanism according to embodiments of the present disclosure.

DETAILED DESCRIPTION

Figure 1:
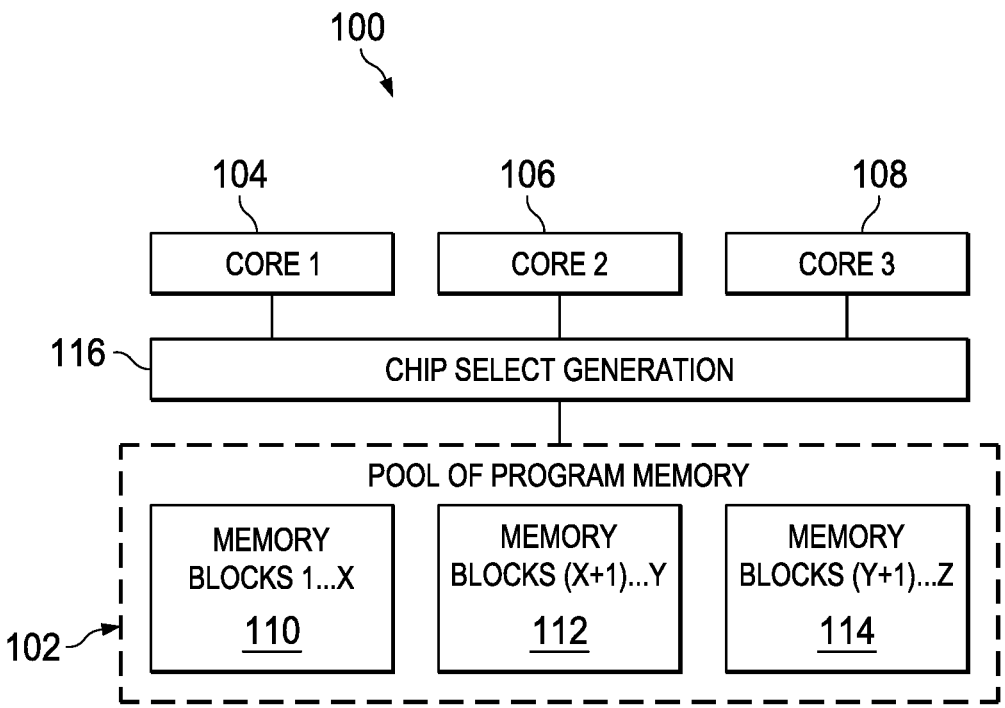
FIG. 1 is an illustration of a system for allocating portions of a memory pool to multiple processors or processing cores according to embodiments of the present disclosure.

FIG. 1 is an illustration of a system 100 for allocating portions of a memory pool 102 to multiple processors or processing cores 104, 106, 108 according to embodiments of the present disclosure.

System 100 may include more than one processor or more than one processing core in a given processor. Any suitable number or combination of cores or processors may be used. In FIG. 1, three cores 104, 106, 108 are shown as an example. Cores 104, 106, 108 may arise from a single processor or multiple processors, such as a traditional central processing unit (CPU) or a digital signal processor (DSP). Other processors may include those on microcontrollers, application-specific integrated devices, field-programmable gate arrays (FPGAs), or other suitable processing integrated circuits. Cores 104, 106, 108 may share access to memory pool 102.

Memory pool 102 may be divided into multiple memory blocks 110, 112, 114. Memory pool 102 may include ROM or RAM. In one embodiment, memory pool 102 may be program memory. Program memory may include memory for loading and executing an executable or other compiled or executable object in an electronic device. Program memory may be separate from data memory. Data memory may be handled in a separate memory management scheme. While program memory may be used to keep the instructions for a program being executed, data memory may be used for temporarily storing and keeping intermediate results and variables from such program being executed. Program memory may include a boot section and an application program section.

Memory pool 102 may be implemented by physical blocks. For example, each of memory blocks 110, 112, 114 may be a separate, physical memory block. A physical memory block may be referred to as a memory panel. Each memory block 110, 112, 114 may include a device, interface, controller, circuit, or other mechanism for interacting with the rest of system 100. In various embodiments, memory blocks 110, 112, 114 may each be a same or a different size. Each of memory blocks 110, 112, 114 may be assigned to a single one of cores 104, 106, 108. Although a given number of memory blocks 110, 112, 114 are shown in FIG. 1, system 100 may include any suitable number of memory blocks of various sizes. In many situations, there may be multiple more memory blocks than cores.

In one embodiment, system 100 may include a chip select circuit 116 configured to route command signals to memory blocks 110, 112, 114. In another embodiment, chip select circuit 116 and other parts of system 100 may be configured to use existing test inputs or wrappers of memory blocks 110, 112, 114 to route commands and data to and from such memory blocks. Chip select circuit 116 may be implemented by, for example, digital logic. Chip select circuit 116 may replace the use of a bus fabric which may be orders of magnitude larger in terms of size and die cost. For example, such logic of chip select circuit 116 might require only a few hundred logic gates to implement, rather than hundreds of thousands of gates needed to implement a bus fabric.

A definition or specification of which of memory blocks 110, 112, 114 match to ones of cores 104, 106, 108 may be stored in a suitable location. For example, such definitions or specifications may be stored in a non-volatile memory. The definitions or specifications may be implemented in, for example, electronic fuses or other storage. The definitions or specifications may be defined at a time at which applications or other software to be executed on system 100 are compiled. The non-volatile memory storing the definitions or specifications may be accessible to chip select circuit 116. Chip select circuit 116 may include logic to translate a core address to a memory block selection signal based on compile-time information (such as the definitions or specifications) stored in the non-volatile memory.

For software executing on cores 104, 106, 108, chip selection circuit 116 may translate or route a request for an address to a physical one of memory blocks 110, 112, 114. As discussed above, chip selection circuit 116 may make such a translation or routing based upon definitions or specifications in a non-volatile memory. Mapping of core instruction bus addresses to physical memories of memory blocks 110, 112, 114 may be performed upon, for example, device reset.

Figure 2:
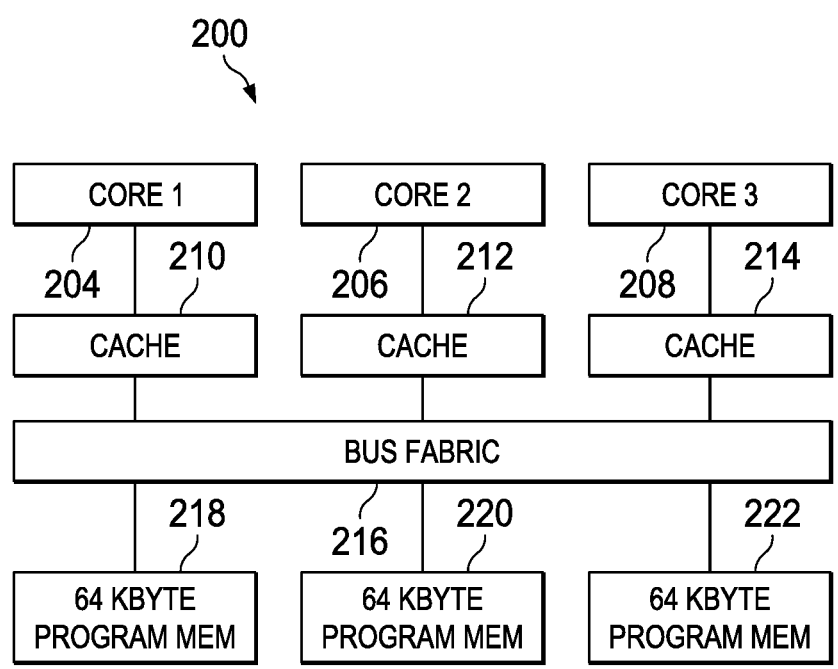
FIG. 2 illustrates an example system using other solutions.

FIG. 2 illustrates an example system 200 wherein other solutions are used for sharing memory. In system 200, it is difficult to know beforehand how much program memory each core will need. Cores 204, 206, 208 may share access to memory allocations 218, 220, 222. Access may be routed through a bus fabric 216. Cores 204, 206, 208 may require caches 210, 212, 214. System 100 might not include such caches. A given core may require a cache and bus fabric 216 to be routed to various allocations 218, 220, 222 of the memory pool. Allocations 218, 220, 222 may be of a same size. Bus fabric 216 may route each core to each allocation as needed. However, this approach introduces performance penalties, complexity of bus fabric 216, and requires performance enhancing techniques such as caching. Bus fabric 216 may be several orders of magnitude greater in size and complexity than chip select circuit 116. Moreover, bus fabric 216 may dynamically change the routing of paths between cores 204, 206, 208 and allocations 218, 220, 222.

Returning to FIG. 1, developers of programs, executables, or applications for the system may compile programs for execution on system 100. For program memory, the amount of program memory needed for each of cores 104, 106, 108 may be determined statically at compile time. The programmer may specify which of cores 104, 106, 108 is to handle a particular task. The amount of program memory needed for a given core may thus be determined at compile time. Data memory may be dependent upon outside variables, and thus not fixed, and accordingly not known at run time. Accordingly, system 100 may administer program memory by mapping cores to memory blocks while data memory may be separately handled.

Memory pool 102 may be a common pool of program memory. Memory pool 102 may be composed of individual physical memory blocks 110, 112, 114. At compile time, different numbers of memory blocks 110, 112, 114 may be assigned to various ones of cores 105, 106, 108. Individual ones of memory blocks 110, 112, 114 may be allocated together in contiguous or non-contiguous blocks. Unused ones of memory blocks 110, 112, 114 may be designated as such. Unused ones of memory blocks 110, 112, 114 may be powered down, put into sleep mode, or otherwise switched off.

The size of each of memory blocks 110, 112, 114 might be different from each other. However, the particular size and quantity of each of memory blocks 110, 112, 114 may be fixed in a particular instance of system 100. Different instances of system 100 may include different combinations (in terms of particular sizes and quantity of each) of memory blocks 110, 112, 114. However, to compile software for system 100, the particular memory configuration of memory blocks 110, 112, 114 might need to be known. The compilation process may take into account different options for combinations of memory blocks 110, 112, 114 to make more granular memory assignments between cores 104, 106, 108 and memory blocks 110, 112, 114.

Figure 3:
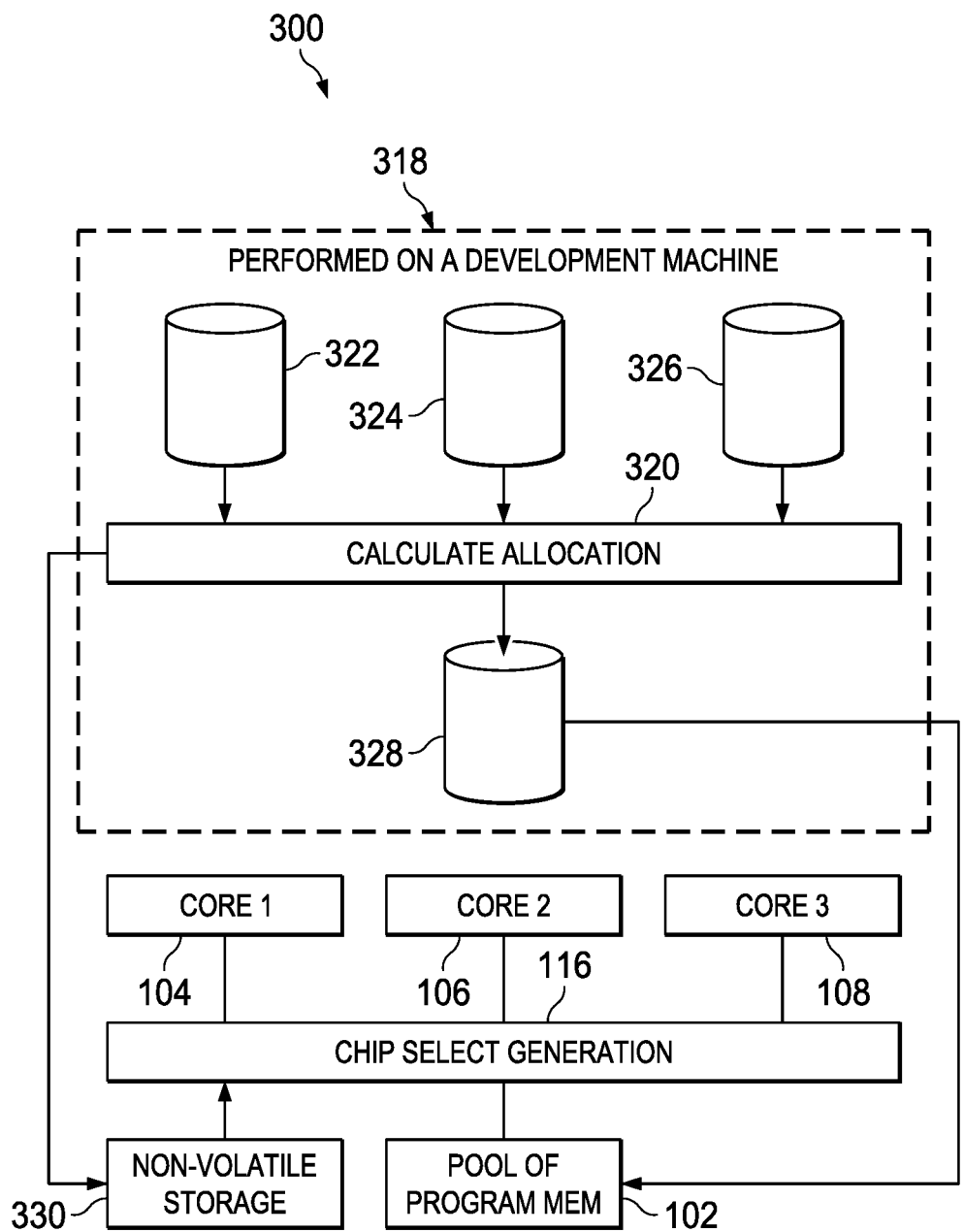
FIG. 3 is a more detailed view of a system for allocating portions of a memory pool to multiple processors or processing cores according to embodiments of the present disclosure.

FIG. 3 is a more detailed view of system 100 for allocating portions of memory pool 102 to multiple processors or processing cores 104, 106, 108, according to embodiments of the present disclosure. FIG. 3 may illustrate example operation to create and compile a program or application that is to be loaded into a target machine.

Compilation may be shown in block 318. In one embodiment, compilation may be performed on a same machine as the rest of system 100. In another embodiment, compilation may be performed on a different machine as the rest of system 100. Compilation may be performed on a development machine. Compilation may be performed at any suitable time, including long before programs are executed on cores 104, 106, 108. Compilation may result in compiled code 328. Compiled code 328 may be provided to system 100 through any suitable mechanism, such as over a network or in a medium. Compiled code 328 may be stored in long-term memory until it is loaded into program memory in memory blocks 110, 112, 114 for execution.

Block 318 may include an allocation program 320 configured to determine which of cores 104, 106, 108 will use which of memory blocks in memory pool 102. Allocation program 320 may be included in or may be separate from other applications or programs used for compilation of code into object code. Allocation program 320 may be implemented by instructions on a computer-readable medium that, when loaded and executed by a processor, cause the allocation program 320 to perform its functionality as described in the present disclosure. Allocation program 320 may be further implemented by any suitable combination of libraries, scripts, executables, applications, or other software. Allocation program 320 may be configured to determine program memory requirements for each of cores 104, 106, 108. The program memory requirements may be based upon code 322, 324, 326 to be executed by respective ones of cores 104, 106, 108. Code 322, 324, 326 may include compiled code images for respective cores 104, 106, 108. Allocation program 320 may be configured to match elements from memory pool 102 to cores 104, 106, 108. The allocation may be determined at compile time. The allocation may be based upon particular tasks to be executed on different cores 104, 106, 108 as designed by a programmer. Program memory requirements may be determined for each core 104, 106, 108. The needs expressed in compiled images 322, 324, 326 for cores 104, 106, 108 may be used by allocation program 320 to find an optimal memory allocation. An error may be raised if the different images cannot be placed into the physical memory.

Once the overall application loaded on a target machine, code images 322, 324, 326 may be loaded into different portions of memory pool 102. Allocation information—that is, which physical memory block of memory pool 102 maps to which core 104, 106, 108—may be stored in non-volatile storage 330 of system 100.

In one embodiment, calculating the allocation may be performed by memory mapping the pool of memory into the same addresses in each core's memory map. In such a case, memory assigned to a given core 104, 106, 108 might be contiguous. This may be a relatively easy solution to implement, as it may require no address translation. However, this solution may be problematic as each core may likely have the same boot address. For example, core 104 may require 64k of program memory at base address 0x0_0000, core 106 may require 30k of program memory at base address 0x1_0000, and core 108 may require 128k of program memory at 0x2_0000. The total requirement may be 222k of program memory. With these sizes and addresses, none of the cores might have overlapping address rangers. With a pool of eight 32k blocks, core 104 might be assigned the first two blocks, core 106 might be assigned a third block, a fourth block may be allocated as "off", and the remaining four blocks may be allocated to core 108. In this scenario, the eight 32K blocks might be considered as a single pool of 256K memory in a single memory map that all three cores share, because they have no overlap in their individual memory maps. Therefore, selecting a memory block is purely a function of the allocation bits (as shown below in FIG. 6) and not of the address generated by each core. Implementation of this scheme could be made wherein the generation of the chip select for each memory block can be decided using only the allocation bits and the addresses from each core with no translation of the addresses. This solution provides the fastest logic path, and therefore the highest possible memory access frequency.

In another embodiment, calculating the allocation may be performed by a fully flexible allocation. In a fully flexible allocation, memory assigned to a given core 104, 106, 108 might not be contiguous. This may require address decode or translation for memory chip-select assertion. This may add to the timing path in chip selection circuit 116 needed to access a given part of memory pool 102. For example, core 104 may require 64k of program memory at base address 0x0_0000, core 106 may require 30k of program memory at base address 0x1_0000, and core 108 may require 128k of program memory at 0x2_0000. The total requirement may be 222k of program memory. With a pool of memory including two 64k blocks and four 32k blocks, core 104 might be assigned the first 64k block, and no address decode or translation might be required. Core 106 may be assigned a first one of the 32k blocks. Core 108 may be assigned the second one of the 64k blocks, and the second and third 32k blocks. The fourth 32k block may be unused. With this scheme, designers may have complete flexibility. However, the implementation may be slightly more complex in that the chip select generation must now subtract the base address of each core from the address generated by each core along with the allocation bits (as shown in FIG. 6) in order to determine a chip select assertion. This makes the logic path slightly longer than the contiguous memory map scenario, but provides the flexibility to accommodate all permutations of memory maps. In yet another embodiment, calculating the allocation may be performed by a combination of these approaches. The memory may be mapped directly into the memory map of the most time critical core. Thus, for memory at this core, addressing may begin at 0x00. Other cores may have to map into that same memory map. In such an embodiment, address and data busses might only be sniffed, rather than modified. Accordingly, no timing penalty may be experienced on the address and data busses.

At compile time, any suitable combination of the blocks may be assigned to a given core. For example, the memory blocks may include 2-8k memory blocks, 2-16k memory blocks, and 2-64k memory blocks. If Core1 requires 22k of program memory, Core1 could be assigned (at compile time) one of the 8k memory blocks and one of the 16k memory blocks. In such a case, 2k of memory may be wasted. Core1 could alternatively be assigned two 16k blocks, or a single 64k block. These would incur even more wasted space.

However, the allocation may take into account requirements of the other cores. In such a case, Core2 and Core3 might only need 8k of program memory each. Thus, assigning two 16k blocks to Core1 might be optimal, as the unused blocks are switched off.

Code may be compiled for a particular implementation of memory pool 102. Thus, an instance of memory pool 102 with a different number of memory blocks, or memory blocks of different sizes, would require a different compiled image. Allocation program 320 may target the particular memory configuration at compile time.

Figure 4:
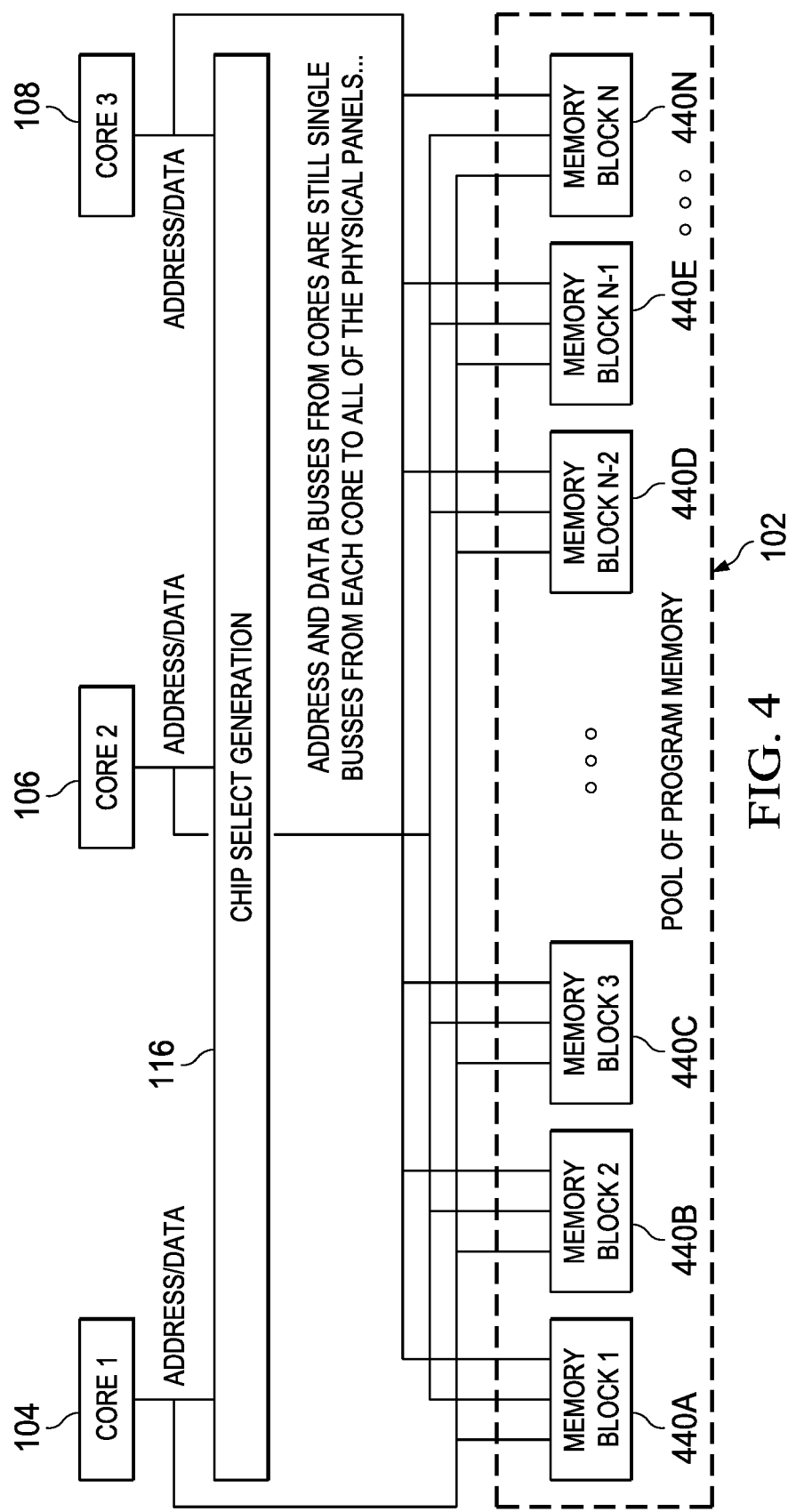
FIG. 4 is a yet another more detailed view of a system for allocating portions of a memory pool to multiple processors or processing cores according to embodiments of the present disclosure.
Figure 5:
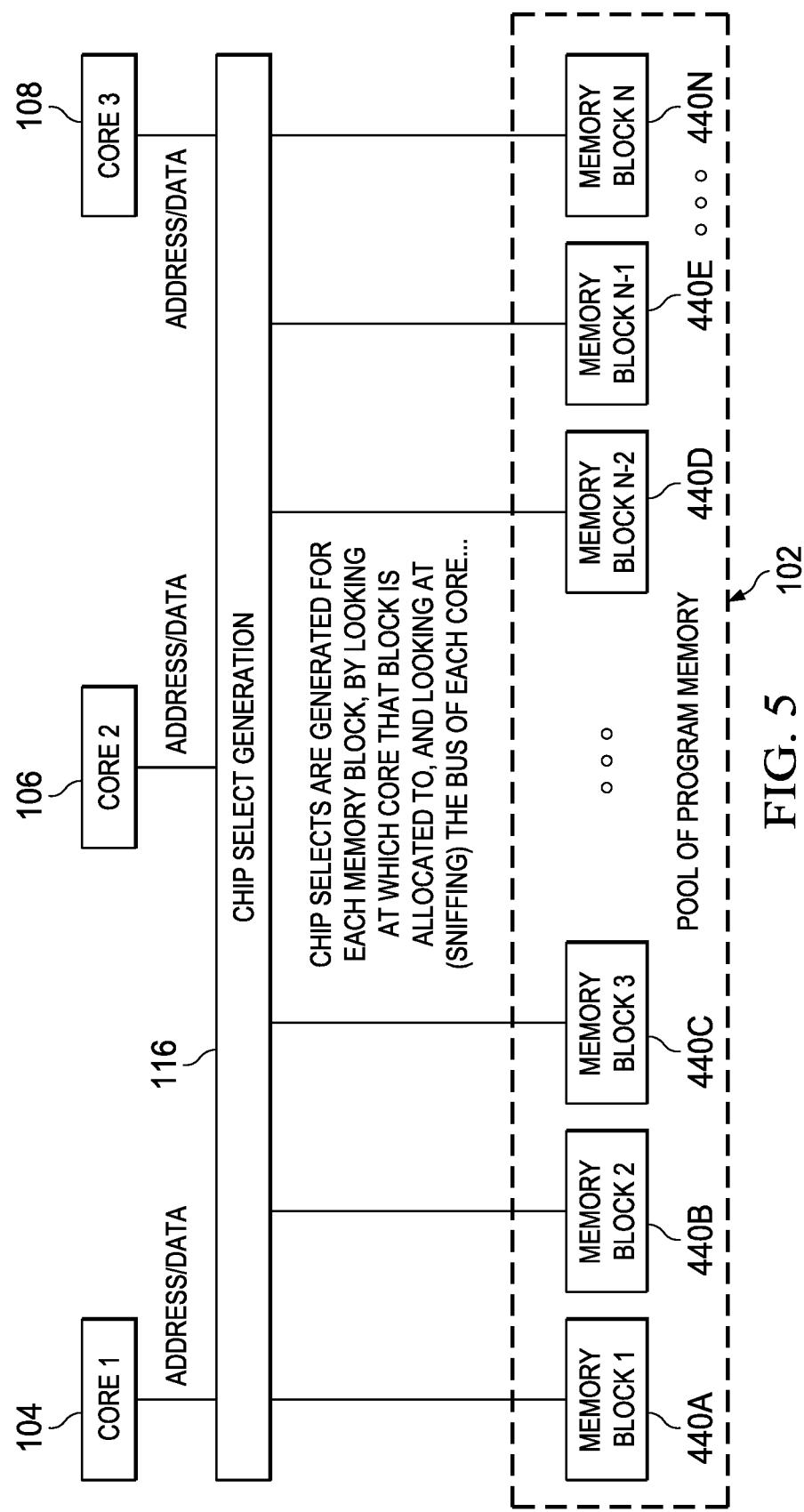
FIG. 5 is a more detailed view illustrating chip select paths in a system for allocating portions of a memory pool to multiple processors or processing cores, according to embodiments of the present disclosure.

FIG. 4 is a yet another more detailed view of system 100 for allocating portions of memory pool 102 to multiple processors or processing cores 104, 106, 108, according to embodiments of the present disclosure. FIG. 4 may illustrate operation of the system once a program has been compiled, is loaded into a target machine, and is executing. Furthermore, FIG. 4 may illustrate address and data paths between chip select circuit 116, cores 104, 106, 108, and memory blocks 440. FIG. 5 below may illustrate chip select paths.

As shown in FIG. 4, address and data busses may be routed from each of cores 104, 106, 108 to each memory block 440 of memory pool 102. more example memory blocks 440 are shown in FIG. 4 than are shown in FIG. 1, for illustrative purposes. Each memory block 440 may be routed to each core 104, 106, 108. Accordingly, attempted access of a given memory block 440 may be made by all of cores 104, 106, 108. The gating or allowing of the actual access to a given memory block 440 may be controlled through chip select circuit 116.

The size of memory blocks may be fixed according to the manufacture of memory pool 102. However, different instances of memory pool 102 may include variations of quantities and sizes of memory blocks 440. For example, any single memory block 440 might implement between 8k and 64k of memory. In a system-on-chip (SoC) implementation or other solutions, the memory may be customized as to the size of memory blocks 440. In such a case, the size of different ones of memory blocks 440 may be different from one another. In contrast, if commercially available off-the-shelf memory is used, the size of memory blocks 440 are likely to be uniform.

Each memory block 440 may include a main access port. Each memory block 440 may also include a memory test port. In one embodiment, each memory block 440 may be assigned or dedicated by the application to a single one of cores 104, 106, 108. The assignment may be made at compile time, as described above. However, in terms of physical structure in system 100, each core 104, 106, 108 might require a route to each memory block 440 as shown in FIG. 4 to accommodate the possible configurations and assignments made by various software that might be loaded. In one embodiment, a fastest or highest priority one of the cores 104, 106, 108 may be connected directly to each one of memory blocks 440 using the main access port of the respective memory block 440. In another embodiment, the other ones of cores 104, 106, 108 may be connected to each memory block 440 using the memory test port.

FIG. 5 is a more detailed view illustrating chip select paths in system 100 for allocating portions of memory pool 102 to multiple processors or processing cores 104, 106, 108, according to embodiments of the present disclosure.

Chip select circuit 100 may be connected to each respective memory block 440. These connections may be separate from each other. Chip select circuit 100 may be configured to determine, for a particular access, whether to issue a chip select signal to a respective memory block 440. Chip select signals may be generated for a given memory block 440 by looking at which of cores 104, 106, 108 is to be executed or loaded. The ones of memory blocks 440 that are associated with such a one of cores 104, 106, 108 may be issued a chip select signal by chip select circuit 100. Other ones of memory blocks 440 may receive no such signal at that particular moment in time.

Chip select circuit 100 may access non-volatile memory for the mappings between cores 104, 106, 108 and memory blocks 440 to determine to which memory blocks chip select signals will be sent. In one embodiment, the bus of each of cores 104, 106, 108 may be sniffed to determine which memory blocks will receive a chip select signal at a given moment in time.

FIG. 6 illustrates an example allocation designation mechanism according to embodiments of the present disclosure. The contents of FIG. 6 may illustrate the organization and denotation of contents in non-volatile memory 330. For example, FIG. 6 may illustrate a 32-bit word. The contents may be implemented by, for example, Flash fuses, OTP, electronic fuses, or other suitable mechanisms. The non-volatile memory may include programmable storage to assign a given memory block 440 to a given core 104, 106, 108.

In the example 32-bit word of FIG. 6, sixteen memory blocks may be designated. If system 100 includes more than sixteen memory blocks 440, then a different implementation would be required than shown in FIG. 6, such as one that can hold more than 32-bits.

Each memory block 440 may be assigned to a given core 104, 106, 108. In the example of FIG. 6, three cores may be used. Thus, two bits may be used to designate a given memory block's (440) assigned core 104, 106, 108. If system 100 includes more than four cores, then a representation with larger capacity might be required. The 32-bit word may be determined at compile time. Each memory block 440 may be a RAM panel and may be a physical block of memory. Cores 104, 106, 108 may include, for example, a DSP core, an application CPU core, and another CPU core. An instance of a DSP core may be the highest priority processor core of these example cores.

Sixteen addressable memory blocks are shown in FIG. 6. Nevertheless, memory blocks 440 may be of different sizes. Each memory block is shown with an example command or instruction value (RAMALLOCXX, wherein XX denotes the memory block label 1 ... 16) that may be routed to other circuitry. The value may be represented, as discussed above, with two bits. A bit representation of "11" may mean the respective memory block 440 is assigned to a DSP core. A bit representation of "10" may mean the respective memory block 440 is assigned to an application core. A bit representation of "01" may mean the respective memory block 440 is assigned to a BLUETOOH (BT) core. A bit representation of "00" may mean the respective memory block 440 is not assigned to any DSP core, and may be switched off.

Values from individual ones of RAMALLOCXX may be routed to chip select circuit 116. Chip select circuit 116 may issue control signals to memory blocks 440 based upon the values of RAMALLOCXX.

Figure 7:
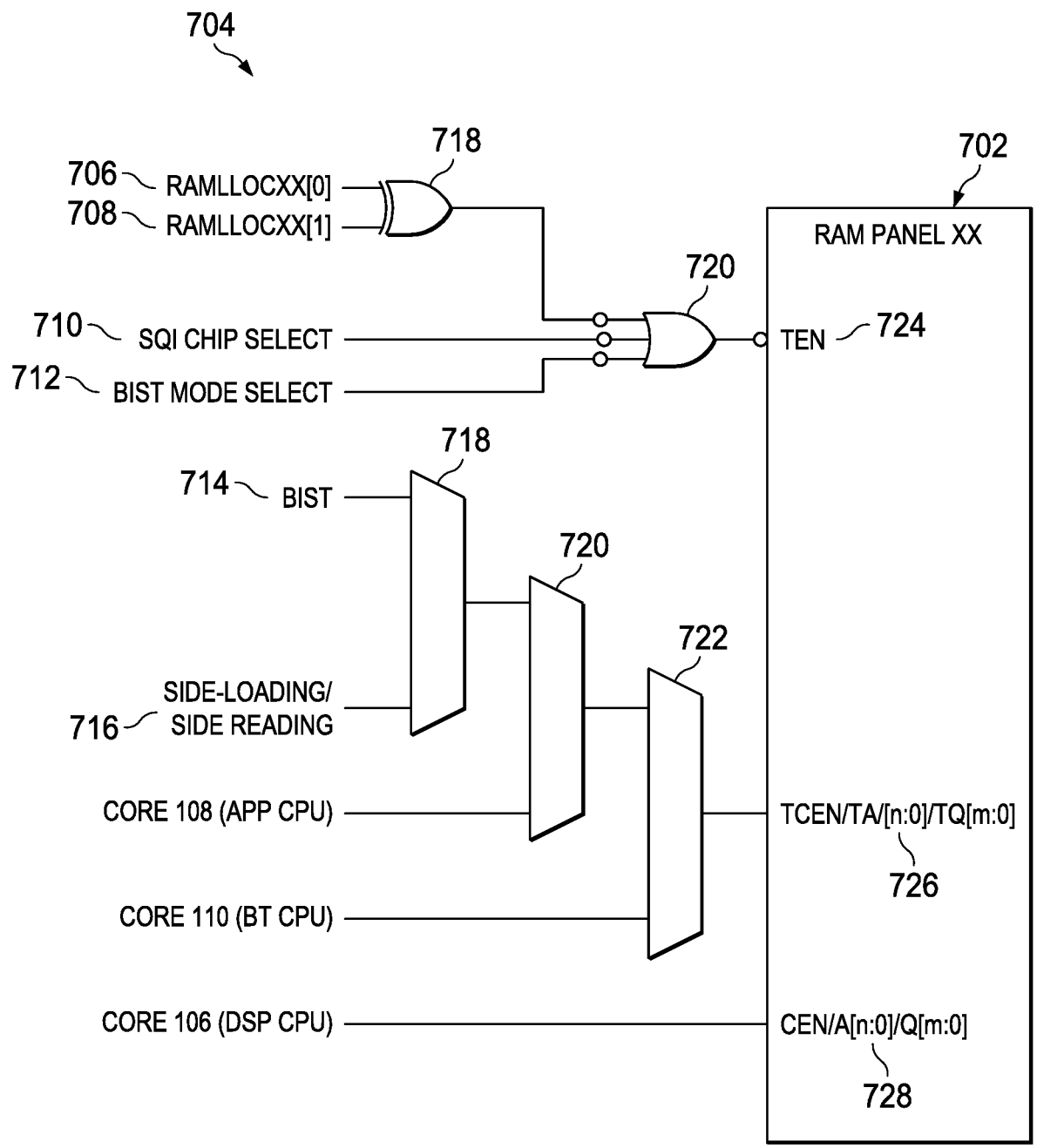
FIG. 7 is an illustration of chip select logic and a RAM panel, according to embodiments of the present disclosure.

FIG. 7 is an illustration of chip select logic 704 and a RAM panel 702, according to embodiments of the present disclosure. RAM panel 702 may implement any of the memory blocks described in the above figures. Chip select logic 704 may be implemented in chip select circuit 116 or in another suitable portion of system 100. The elements of FIG. 7 may be replicated for each physical memory block in system 100.

RAM panel 702 may include a primary or functional port 728. Primary port 728 may include pins or input/output for chip-select/enable (CEN), address (A)—A[n:0 bits], and data—Q [m:0 bits]. The "N" of CEN may indicate that the signal is active-low, but in various embodiments an active-high implementation may be used instead. CEN may be the input to RAM panel 702 that indicates to RAM panel 702 that it is being addressed and should perform a read or write. The address fields may be the bits of address input to RAM panel 702. This may be the read or write address when RAM panel 702 is addressed. The data fields may be the bits of data to be read or written. For a read operation, A[n:0] may be driven to a particular address, CEN may be asserted (set to low if CEN is active-low), and Q[m:0] may be sampled to obtain the read data. Although shown as a single port, primary port 728 may be implemented with any suitable number of pins or ports. For example, each of CEN, A, and Q may be implemented with separate pins. Data to be written to or read from RAM panel 702 may be handled through primary port 728. In other solutions, such as shown in FIG. 2, a bus matrix may route an appropriate one of the cores to this primary port 728, such as cores 106, 108, 110.

RAM panel 702 may include a test port 726. Test port 726 may include pins or input/output for test CEN (TCEN), test address—TA[n:0 bits], and test data—TQ [m:0 bits]. Although shown as a single port, test port 726 may be implemented with any suitable number of pins or ports. For example, each of TCEN, TA, and TQ may be implemented with separate pins. Self-tests, such as built-in-self-test (BIST) or side-loading or side-reading (SQI) of memory may be performed through test port 726. BIST may include an instruction for RAM panel 702 to test itself. Side-loading or side-reading of memory may include writing to or reading from memory with, for example, a debugger. In other solutions, such as shown in FIG. 2, internal test circuitry of a system may route BIST 714 or side-loading or side-reading 716 signals to this test port 726.

If RAM panel 702 is not manufactured with primary port 728 or test port 726 and the associated interfaces thereon, designers may include a wrapper around the core memory block to replicate these features. The wrapper may be implemented with a suitable combination of digital and analog circuitry.

A mode of which port of test port 726 or primary port 728 that is to be used by RAM panel 702 may be set by a test enable (TEN) pin 724. The combination of test port 726 and primary port 728 may make up a wrapper for RAM panel 702. Functionally, primary port 728 (including CEN/A[n:0]/Q[m:0]) may be active (that is, the input ports/pins that RAM panel 702 actually examiners or uses) when TEN 724 is not asserted. Furthermore, test port 726 (TCEN/TA[n:0]/TQ[m:0]) may be active when TEN 724 is the opposite value and is asserted.

In one embodiment, system 100 may reuse test port 726 to pass signals for one or more cores. In a further embodiment, system 100 may pass signals for a single core through primary port 728. In another, further embodiment, signals for a fastest or highest priority core may be passed through primary port 728. In yet another, further embodiment, signals for other cores may be shared through test port 726. The other cores may be slower or less of a priority. The designation of priority may be made during compilation. The other cores may be passed through or otherwise share paths with test logic for test port 726. The priority core may be directly connected to primary port 728.

For example, core 106 may represent a DSP CPU that is faster and a higher priority. Core 106 may be directly connected to primary port 728. Furthermore, core 106 may be directly connected to the primary port of all instances of RAM panels in system 100. The signals sent by core 106 may be sufficient for addressing and reading and writing data. Other cores, such as core 108 (representing an application CPU) and core 110 (representing a BT CPU) may share access to test port 726. Moreover, core 108 and core 110 may further share access to test port 726 with test logic for RAM panel 702. Such test logic may include BIST 714 or side-loading/side-reading 716 signals. Core 108 and core 110 may be connected, albeit through selection logic, to the test port of all instances of RAM panels in system 100.

RAM panel 702 may be configured to use test port 726 or primary port 728 based upon a test mode enable input 724. For example, when input 724 is high, reads and writes of data may be performed through test port 726, or when input 724 is low, reads and writes of data may be performed through primary port 728. The logic levels of these selections may be reversed as appropriate. When one of test port 726 or primary port 728 is selected, the other input may be ignored.

Any suitable mechanism, circuitry, or logic may be used to determine whether to use test port 726 or primary port 728. If SQI chip select 710 or BIST mode select 712 are enabled by other test portions of system 100 (not shown), then test port 726 may be selected. Furthermore, if RAM panel 702, denoted as number XX of the available RAM panels in system 100, is assigned to core 108 or core 110, then test port 726 may be selected. Otherwise, RAM panel 702 may be assigned to core 107. In such a case, primary port 728 may be selected. Logic 704 may include a determination of whether RAM panel 702, as RAM Panel XX, is assigned to core 108 or core 110 as specified in mechanism such as non-volatile memory or in FIG. 6. For example, for a given bit pair RAMALLOCXX in the 32-bit word of FIG. 6, "11" denotes that RAM Panel XX is allocated to the DSP (core 106); "10" denotes that RAM Panel XX is allocated to the application CPU (core 108); "01" denotes that RAM Panel XX is allocated to the BT CPU (core 110); and "00" denotes that the RAM Panel XX is not allocated to any CPU. Using this example implementation, logic 704 may thus include an XOR 718 operation on inputs from RAMALLOCXX. Specifically, the two bits RAMALLOCXX[0] 706 and RAMALLOCXX[1] 710 are compared. These may be routed from the fuses of FIG. 6. If one, but not both, of these bits are set, then it may be determined that RAM PANEL XX 702 is allocated to one of core 108 or core 110, and thus test port 726 is to be used. Furthermore, test port 726 is to be used in any case where system 100 has ordered memory testing, such as when SQI chip select 710 or BIST mode select 712 are enabled. Thus, output of XOR 718, SQI chip select 710, and BIST mode select 712 may be compared in an OR 720 operation and passed to test enable port 724.

Any suitable mechanism, circuitry, or logic may be used for core 108, core 110, and test logic to share access to test port 726. For example, core 108, core 110, BIST 714, and side-loading/side-reading 716 may be multiplexed together through a suitable combination of multiplexers 718, 720, 722 to share access to test port 726. Selection signals for multiplexers 718, 720, 722 may be controlled by logic 704 or chip select circuit 116. The selection signals for multiplexer 718 may include SQI chip select 710 or BIST mode select 712. An appropriate one of BIST 714 or side-loading/ side-reading 716 may be routed from multiplexer 718 to multiplexer 720. If neither are to be used, the input from multiplexer 718 to multiplexer 720 might not matter. The selection signals for multiplexer 718 may include SQI chip select 710 logically OR'd with BIST mode select 712. If neither of these are enabled, multiplexer 720 might pass signals from core 108 to multiplexer 722. Otherwise, multiplexer 720 may pass the input from multiplexer 718 to multiplexer 722. The selection signal for multiplexer 720 might instead be based upon RAMALLOCXX set to {1,0} or an equivalent thereof. The selection signals for multiplexer 722 may include, for example, RAMALLOCXX set to {0,1} or an equivalent thereof. If so, multiplexer 722 might pass core 110 signals to test port 726. Otherwise, multiplexer 722 might pass the input received from multiplexer 720 to test port 726. Thus, test port 726 may be multiplexed or shared between the lower priority cores 108, 110, and between such lower priority cores 108, 110 and memory test logic. The multiplexing may cause a small delay in timing. However, core access to memories may be improved overall.

As a result, embodiments of the present disclosure may result in much faster and more area-efficient use of chip resources than a typical bus fabric approach as shown in FIG. 2. Once code is generated, it will be known whether a given memory element will be used. An unused memory element may be powered down if it is not otherwise assigned to a core. Embodiments of the present disclosure might be used for data memory. However, such allocation would need to be controlled by software developed by creators of the application. Embodiments of the present disclosure may result in some memory going to waste. Logical memory partitions may be defined and constrained by physical memory sizes in terms of granularity.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

We claim:

1. An apparatus, comprising:
a plurality of processing cores including a first core and a second core;
a pool of memory including a plurality of memory blocks, wherein each memory block includes a data port and a memory check port;
first connections between the first core and each of the plurality of memory blocks;
second connections between the second core and each of the plurality of memory blocks; and,
a chip selection circuit configured to:
share access between the first core and the second core to the pool of memory through:
enablement of access of data from the first core to the memory blocks through respective data ports of the memory blocks; and
enablement of access of data from the second core to the memory blocks through respective memory check ports of the memory blocks; and
share access to the pool of memory between the first core, the second core, and a third core of the plurality of processing cores by enabling access of data from the third core to the memory blocks through the respective memory check ports of the memory blocks.

2. The apparatus of claim 1, wherein the chip selection circuit is further configured to enable access signals from memory test circuits to the memory blocks through the respective memory check ports of the memory blocks.

3. An apparatus, comprising:
a plurality of processing cores including a first core and a second core;
a pool of memory including a plurality of memory blocks, wherein each memory block includes a data port and a memory check port;
first connections between the first core and each of the plurality of memory blocks;
second connections between the second core and each of the plurality of memory blocks; and,
a chip selection circuit configured to:
share access between the first core and the second core to the pool of memory through:
enablement of access of data from the first core to the memory blocks through respective data ports of the memory blocks; and
enablement of access of data from the second core to the memory blocks through respective memory check ports of the memory blocks; and
enable access of data from the first core through respective data ports and enable access of data from the second core through respective memory check ports based on a determination that the first core is a higher priority core than the second core.

4. The apparatus of claim 1, wherein the chip selection circuit is further configured to simultaneously:
enable access of data from the first core to a given memory block through a respective data port of the given memory; and
enable access of data from the second core to the given memory block through a respective memory check port of the given memory.

5. The apparatus of claim 1, wherein the memory blocks are of different sizes.

6. The apparatus of claim 1, wherein an assignment of memory blocks to respective cores is determined during compilation of software to be executed by the first core and the second core.

7. The apparatus of claim 1, wherein the chip selection circuit is further configured to:
determine from a compilation process an assignment of memory blocks to cores; and
based on a determination that a given memory block is not assigned to a core, turn off the given memory block.

8. A method, comprising:
accessing a plurality of processing cores including a first core and a second core;
accessing a pool of memory including a plurality of memory blocks, wherein each memory block includes a data port and a memory check port;
establishing first connections between the first core and each of the plurality of memory blocks;
establishing second connections between the second core and each of the plurality of memory blocks; a
sharing access between the first core and the second core to the pool of memory, including:
enabling access of data from the first core to the memory blocks through respective data ports of the memory blocks; and enabling access of data from the second core to the memory blocks through respective memory check ports of the memory blocks; and sharing the pool of memory between the first core, the second core, and a third core of the plurality of processing cores by enabling access of data from the third core to the memory blocks through the respective memory check ports of the memory blocks.

9. The method of claim 8, further comprising enabling access signals from memory test circuits to the memory blocks through the respective memory check ports of the memory blocks.

10. A method, comprising:
accessing a plurality of processing cores including a first core and a second core;
accessing a pool of memory including a plurality of memory blocks, wherein each memory block includes a data port and a memory check port;
establishing first connections between the first core and each of the plurality of memory blocks;
establishing second connections between the second core and each of the plurality of memory blocks; a
sharing access between the first core and the second core to the pool of memory, including:
enabling access of data from the first core to the memory blocks through respective data ports of the memory blocks; and
enabling access of data from the second core to the memory blocks through respective memory check ports of the memory blocks; and
enabling access of data from the first core through respective data ports and enable access of data from the second core through respective memory check ports based on a determination that the first core is a higher priority core than the second core.

11. The method of claim 8, further comprising, simultaneously:
enabling access of data from the first core to a given memory block through a respective data port of the given memory; and
enabling access of data from the second core to the given memory block through a respective memory check port of the given memory.

12. The method of claim 8, wherein the memory blocks are of different sizes.

13. The method of claim 8, further comprising determining an assignment of memory blocks to respective cores during compilation of software to be executed by the first core and the second core.

14. The method of claim 8, further comprising:
determining from a compilation process an assignment of memory blocks to cores; and
based on a determination that a given memory block is not assigned to a core, turning off the given memory block.

* * * * *